Dec. 31, 1957  E. H. STAHL ET AL  2,818,095
CLAMPING DEVICE
Filed July 26, 1955
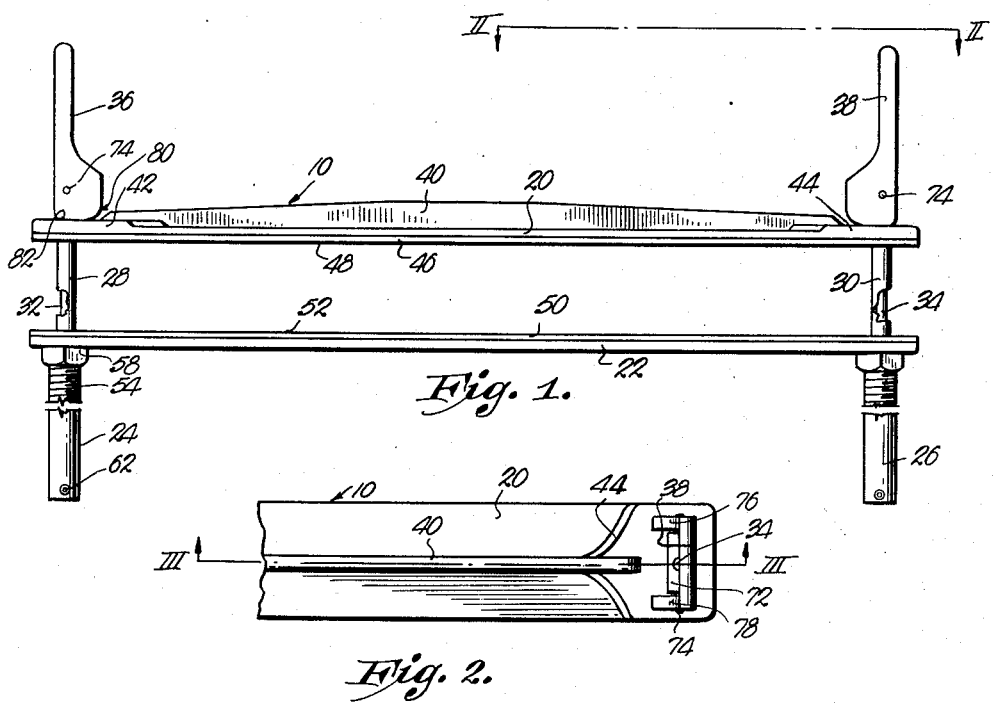
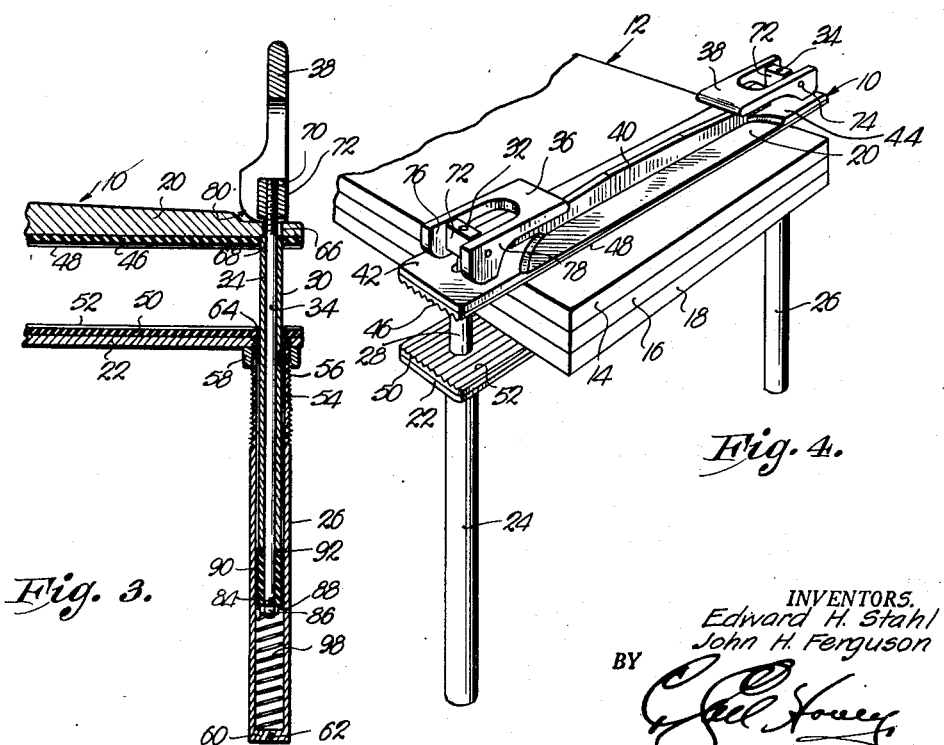
INVENTORS.
Edward H. Stahl
John H. Ferguson
BY
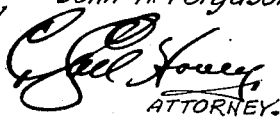
ATTORNEY.

United States Patent Office 2,818,095
Patented Dec. 31, 1957

2,818,095

CLAMPING DEVICE

Edward H. Stahl and John H. Ferguson, Kansas City, Mo.

Application July 26, 1955, Serial No. 524,365

1 Claim. (Cl. 144—290)

This invention relates generally to the field of tools and, more particularly, to an improved device for clamping work pieces which may be of relatively substantial dimension and of various thicknesses.

Heretofore, it has been necessary in such fields as template making, die making, sub assembly work, cabinet making and the like to provide a number of separate clamps for holding together work pieces of any substantial dimension and to operate such devices individually during both the installation and removal with consequent loss of time and labor, not to mention the likelihood that such devices will be operated during installation in a manner not applying the desired clamping pressure to the various portions of the work pieces.

Accordingly, it is the primary object of this invention to provide an improved clamping device overcoming all of the aforesaid and other disadvantages inhering in previous apparatus available for use in comparable applications.

It is another important object of this invention to provide such a clamping device, which is adapted for use on work pieces where the dimensions, including the dimension in the direction that clamping is to be effected, are relatively large.

Another important object of this invention is to provide such a clamping device which is adapted for clamping a work piece of any particular dimension in the direction of clamping within a relatively broad range of such dimensions for which the particular embodiment of device is designed.

Another important object of this invention is to provide such a clamping device which is adapted for use with work pieces having a trapezoidal cross sectional configuration along the zone to be clamped.

Another important object of the invention is to provide such a clamping device which is adapted for exerting a substantially equal clamping pressure along an elongated zone of the work piece.

Still another important object of the invention, including certain significant details of construction, will be made clear or become apparent as the following description of the invention progresses.

In the accompany drawing:

Figure 1 is a side elevational view of one embodiment of clamping device made in accordance with this invention;

Fig. 2 is a fragmentary top plan view of the clamping device illustrated in Fig. 1;

Fig. 3 is a fragmentary cross sectional view of the device taken on line III—III of Fig. 2 and;

Fig. 4 is a perspective view of the device showing a work piece in clamped disposition within the device.

Referring now to the drawing, the device is generally designated by the numeral 10, while a work piece to be clamped is generally designated 12 and includes a number of initially separate layers 14, 16 and 18, which it may be assumed for purposes of illustration constitute a number of pieces of lumber being glued or laminated together by means of an adhesive (not shown) therebetween. Obviously, however, the work piece 12 could be of any nature requiring clamping across an elongated zone thereof during the processing.

The device 10 broadly includes an elongated upper clamping element 20, an elongated lower clamping element 22, a pair of elongated tubular members 24 and 26, an elongated sleeve 28 and 30 for each of members 24 and 26, an elongated rod 32 and 34 for each of sleeves 28 and 30 respectively and an operating handle 36 and 38 for each of rods 32 and 34 respectively. Other important structure will be hereinafter identified.

The upper clamping element 20 is substantially rectangular and is provided with a centrally disposed, longitudinal reinforcing rib 40 and a pair of thickened portions 42 and 44 on its normally uppermost face to strengthen the element 20. On its lowermost surface, the element 20 is provided with a rubber work engaging mat 46 having a longitudinally grooved or serrated face 48 for gripping the work piece 12.

The lower clamping element 22 is substantially rectangular in configuration and is provided with a rubber work engaging mat 50 having a grooved or serrated face 52 on the normally uppermost surface of element 22 and in opposed relationship to the mat 46 and face 48 on clamping element 20.

The tubular members 24 and 26 are threaded as at 54 adjacent their normally uppermost ends and are screwed into corresponding threaded openings 56 adjacent the ends of the lower clamping element 22 from the normally lower side of the latter. Each of the members 24 and 26 is provided with a lock nut 58 upon its threaded portion 54 for securing the interconnection between the member 24 and 26 and the lower clamping element 22. The lowermost end of each member 24 and 26 is closed by a plug 60 held in place by a set screw or the like 62.

The rubber mat 50 is provided with an opening 64 adjacent each end thereof for clearing the sleeves 28 and 30 protruding from the corresponding member 24 or 26. The upper clamping element 20 is provided with an opening 66 adjacent each end thereof and the mat 46 with an opening 68 adjacent each end thereof for passing therethrough the rod 32 or 34 slidably disposed within sleeves 28 and 30 respectively, it being noted that the openings 66 are of diameter sufficient to pass the rods 32 and 34 but not the uppermost extremities of the sleeves 28 and 30. Accordingly, the normally uppermost extremities of the sleeves 28 and 30 pass through openings 68 provided adjacent each end of the mat 46 and then abut against the normally lowermost surface of the upper clamping element 20 in circumscribing relationship to the openings 66 in element 20.

Each of rods 32 and 34 has a portion thereof adjacent its normally uppermost end extending beyond the upper surface of the element 20 and threaded as at 70 for receiving thereon a complementally threaded block 72 disposed above the element 20 adjacent each end of the latter.

The operating handles 36 and 38 are pivotally mounted by pins 74 secured in the blocks 72 upon each of rods 32 and 34 respectively and extending outwardly therefrom through the spaced, opposed leg portions 76 and 78 of each of bifurcated operating handles 36 and 38.

It is significant to note that the leg portions 76 and 78 of each of operating handles 36 and 38 are rounded as at 80 to provide a cam surface cooperable with a corresponding end portion 82 of the upper surface of the element 20 and that the pins 74 are so disposed relative to the cam surface 80 of each of the handles 36 and 28 that as the latter are swung from the released position illustrated in Figs. 1, 2 and 3 to the locked position illustrated in Fig. 4 the blocks 72 will be shifted away from surface portion 82 of the upper clamping element 20. Obviously, when the blocks 72 are so shifted by the manipulation of operating handles 36 and 38, the rods 32 and 34 respectively will be reciprocated relative to the corresponding sleeves 28 and 30, since the latter abut against the lower surface of element 20 while the rods 32 and 34 are slidable therewithin.

Each of the rods 32 and 34 is threaded adjacent its lowermost end as at 84 and receives on such threaded portion 84 a retaining nut 86. Normally disposed above and resting upon the nut 86 is an annular washer 88. Upon the portion of each of rods 32 and 34 just above the washers 88 is disposed an elongated tube 90 of elastic material such as rubber, which is adapted for transverse expansion when longitudinally compressed. An annular washer 92 is disposed between the normally uppermost extent of tube 90 and the lowermost end of the corresponding sleeve 28 or 30.

It will thus be clear that the tube 90 is confined by washers 88 and 92 between the lowermost end of the sleeve 28 or 30 and the nut 86 on the corresponding rod 32 or 34. It will, therefore, be obvious that, whenever the rod 32 or 34 is reciprocated upwardly relative to the corresponding sleeve 28 or 30, the elastic tube 90 will be longitudinally compressed within the corresponding member 24 or 26 and will expand laterally to effect a tight gripping engagement with the interior of such member 24 or 26. Since the sleeves 28 and 30 are slidably received within the members 24 and 26, it will be clear that the upper clamping member 20 may be moved to any position of spacing from the lower clamping member 22 and the operating handles 36 and 38 then operated to reciprocate the rods 32 and 34 relative to the sleeves 28 and 30, thereby compressing the tubes 90 and each of members 24 and 26 for locking the clamping elements 20 and 22 in the desired position. It may also be noted that the configuration of cam surfaces 80 is such that the gripping engagement between tubes 90 and members 24 and 26 is effected slightly before the handles 36 and 37 having fully swung to their locking positions, so that the latter portion of the arc of swing of the handles 36 and 38 will tend to force the upper clamping member 20 down tightly upon the work pieces 12 as the swinging of the handles 36 and 38 to their locked position is completed.

As will be apparent to those skilled in the art, the device 10 may be constructed as illustrated in such manner that the upper clamping element 20 and the rods 32 and 34, sleeves 28 and 30 and tubes 90 may be completely removed from the lower clamping element 22 and its associated members 24 and 26 or, if desired, means such as an annular ring (not shown) engageable with the washers 92 could be provided within the members 24 and 26 adjacent the normally uppermost extremities of the latter for limiting the sliding movement of the sleeve 28 and 30 relative to the members 24 and 26.

The operation of the apparatus should now be clear as involving simply the swinging of the operating handles 36 and 38 to the released position shown in Figs. 1, 2 and 3, raising the upper clamping element 20 from the lower clamping element 22 to permit insertion of the work piece 12 therebetween, then lowering the upper clamping element 20 upon the work pieces 12 and swinging the operating handles 36 and 38 to their locked positions for actuating the tubes 90 into holding relationship in the members 24 and 26 and for forcing the upper element 20 tightly down upon the working pieces 12 as the swing of the operation handles 36 and 38 is completed. It may be noted that the openings 66 in the upper element 20 are preferably slightly elongated longitudinally of the element 20 to permit limited swinging of the element 20 relative to rods 32 and 34 for clamping of the device 10 upon a work piece 12 where the thickness varies from one edge of the zone to be clamped to the opposite end of such zone, that is, a work piece 12 having non-parallel faces. A coil spring 98 is preferably provided within member 26 between plug 60 and nut 86 for yieldably biasing rods 32 and 34 upwardly to normally maintain elements 20 and 22 in spaced relationship expediting the insertion of a work piece 12 therebetween.

Manifestly, many minor modifications and changes could be made from the exact structure described for purpose of illustration without departing from the true spirit and intention of the invention. Accordingly, it is to be understood that the invention shall be deemed limited only by the scope of the appended claim.

Having thus described the invention what is claimed as new and desired to be secured by Letters Patent is:

A clamping device comprising a pair of opposed work-engaging elements, each having an opening therein; an elongated tubular member secured at one end thereof to one element and having a longitudinal bore in aligned communication with the opening of said one element; an elongated sleeve slidably disposed within the bore of the member and extending beyond said one end of the latter, through the opening of said one element, and into end-abutting engagement with the other element, said sleeve having a longitudinal passage in aligned communication with the opening of said other element; an elongated rod slidably disposed within the sleeve and having one end thereof extending beyond the end of the sleeve abutting said other element and through the opening of the latter, the other end of the rod extending beyond the other end of the sleeve within the bore of the member; laterally extending structure on the rod adjacent said other end of the latter and within the member in spaced relationship to said other end of the sleeve; a resilient tube on the rod within the member between said structure and said other end of the sleeve; and an operating handle swingably secured on the rod and having a cam surface operatively engageable with said other element for reciprocating the rod relative to the sleeve as the handle is swung relative to the rod.

References Cited in the file of this patent
UNITED STATES PATENTS

| | | |
|---|---|---|
| 864,166 | Herrick | Aug. 27, 1907 |
| 1,554,497 | Goff | Sept. 22, 1925 |
| 2,157,345 | Nelson | May 9, 1939 |
| 2,499,056 | Courtot | Feb. 28, 1950 |
| 2,645,143 | Larson | July 14, 1953 |
| 2,666,352 | Philips | Jan. 19, 1954 |